Figure 1:
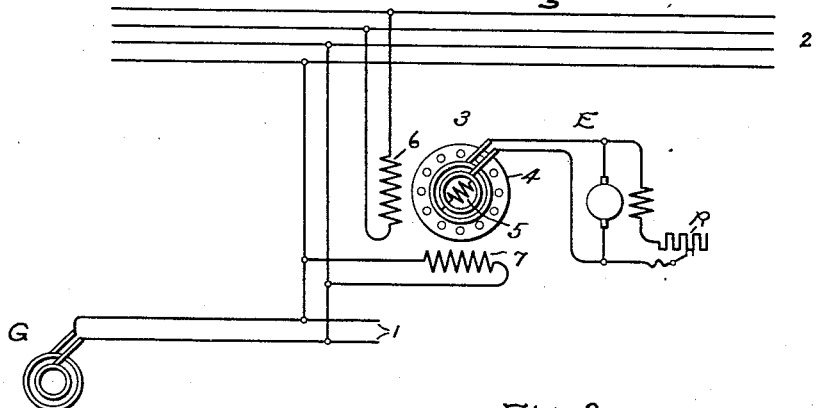

E. F. W. ALEXANDERSON.
SYSTEM OF PHASE MODIFICATION.
APPLICATION FILED FEB. 23, 1917.

1,300,544.

Patented Apr. 15, 1919.
4 SHEETS—SHEET 1.

Inventor:
Ernst F. W. Alexanderson,
by Albert G. Davis
His Attorney.

E. F. W. ALEXANDERSON.
SYSTEM OF PHASE MODIFICATION.
APPLICATION FILED FEB. 23, 1917.

1,300,544.

Patented Apr. 15, 1919.

Inventor:
Ernst F. W. Alexanderson,
by Albert G. Davis
His Attorney

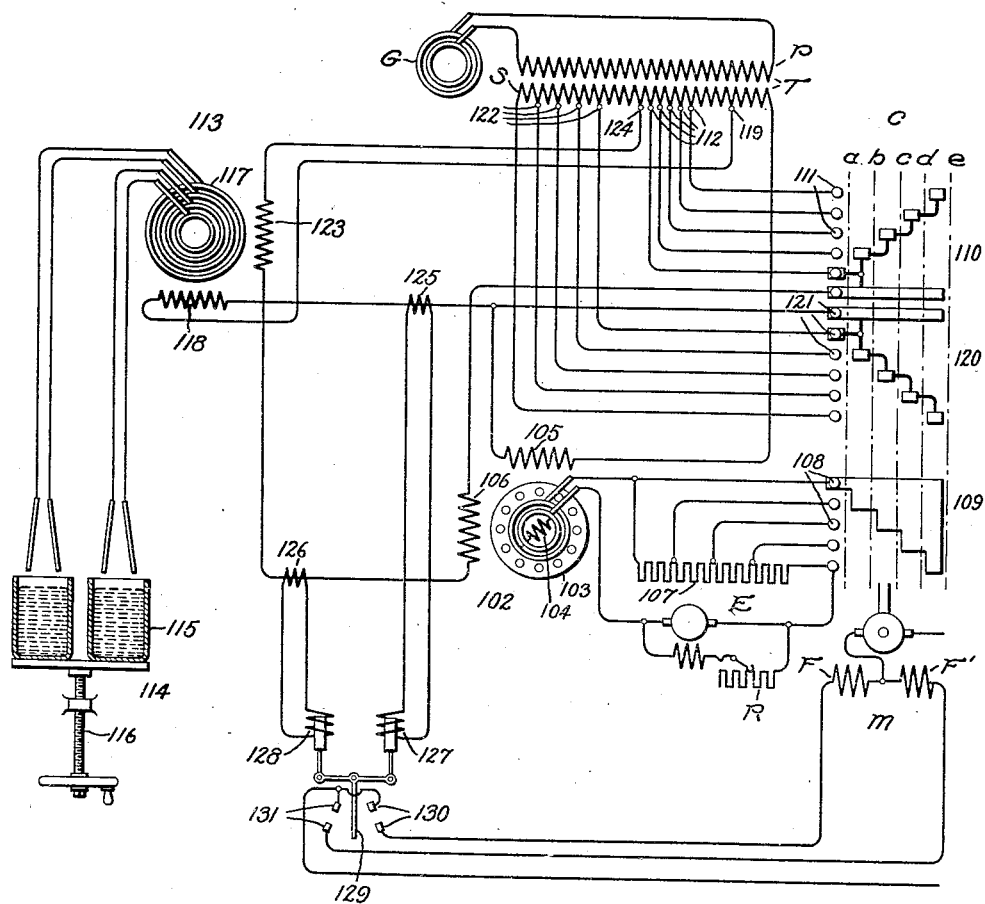

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF PHASE MODIFICATION.

1,300,544.      Specification of Letters Patent.      Patented Apr. 15, 1919.

Application filed February 23, 1917. Serial No. 150,413.

*To all whom it may concern:*

Be it known that I, ERNST F. W. ALEXANDERSON, a citizen of the United States, residing at Schenectady, in the county of Schenectady, State of New York, have invented certain new and useful Improvements in Systems of Phase Modification, of which the following is a specification.

My invention relates to systems of electrical distribution and more particularly to a system in which a phase converter of the polyphase induction motor type is employed in connection with a single phase supply circuit and a polyphase load circuit to transform single phase energy into polyphase energy.

It is well known that, by suitable connection of the phases of an ordinary induction motor, single phase energy may be taken from a single phase circuit and be delivered as polyphase energy to a polyphase circuit, the induction motor functioning as a phase converter. If the converter be provided with an ordinary phase wound or squirrel cage rotor the magnetization of the converter must be effected by means of the stator windings.

I have discovered, however, that if the rotor of the converter be provided with a suitable winding which is excited from a direct current source, it becomes possible to wholly eliminate the magnetizing current in the stator windings by properly adjusting the direct current excitation. Synchronous excitation of the converter in this manner is attended by very desirable results for reasons which I will now explain in connection with a system in which polyphase induction motors are adapted to be operated from a single phase source of supply. The phase converter has the object of delivering to the second phase of the motor energy in the same form as the energy absorbed directly by the first phase so that a true rotating field is produced and the currents in the different windings are balanced. The energy that must be delivered to an induction motor is partly the energy flow which can be measured by a wattmeter, and partly the so-called wattless or reactive energy which is not measured by a wattmeter, but is a real energy flow which goes out from the source and returns during each half cycle. The energy of the first form which represents the power input to the motor can be derived only from the power distribution system, whereas, the energy of the second form, or the wattless energy, can be generated locally by the phase converter without the necessity of a corresponding amount of wattless energy being furnished from the power system.

When the converter and motors have the so-called multiple arrangement of connections, which terms are herein employed to designate those arrangements of connections wherein a motor phase and a converter phase are each adapted to be subjected to the same, or different, portions of the voltage of the single phase circuit, if the converter be synchronously excited in the manner described, it will, in case the synchronous excitation be properly adjusted, generate all the wattless energy consumed by the motors. If the exact quantity of wattless energy consumed by the motors be generated by the converter, the system will draw only power current from the lines, that is, it will operate at unity power factor. The wattless energy generated by the converter will be furnished by each phase of the converter directly to the corresponding motor phase. This method of furnishing the wattless energy to the motor has the advantage that no phase conversion of the wattless energy is required and hence the losses incident thereto are avoided. Furthermore, the transformer equipment may be correspondingly reduced in size since it is required to carry only the watt energy.

With the arrangement of connections hereinbefore referred to, upon a variation in the load the polyphase currents become unbalanced and a readjustment of certain electrical conditions is necessary to restore the balance between the polyphase currents notwithstanding the synchronous excitation of the converter in the manner indicated. However, by adjusting the excitation of the converter, and certain other electrical conditions in the system, it is possible not only to secure the desired relation between the polyphase currents, but also to increase the power factor of the system as desired. The ability to increase the power factor is of great importance as it not only improves the operation of the generators, by which the single phase supply circuit is supplied, but renders available at the polyphase load a much higher voltage, which is of especial importance where such load consists of polyphase motors employed in railway traction work, since it materially increases the efficiency and output of the motors.

The relative effect, or necessity, of varying the values of different electrical conditions such as the synchronous excitation, the voltage impressed on the converter phase which is connected in miltiple with one phase of the motor phase to the single phase source, and the voltage interpolated in circuits comprising other converter phases and motor phases will now be explained. In my former Patent #901,513 I have shown how a phase converter can be regulated in such a way as to deliver both the power energy and the wattless energy to the different phases of the motor by converting both these forms of energy from the single phase power supply. In this case the desired results are accomplished by relatively increasing the field strength of the phase converter along the axis of the first phase by supplying the power to this phase in such a form that an increased voltage per turn of the winding is produced. This increase field strength of the first phase creates correspondingly increased induction, through the agency of the short circuited rotor winding, in the second phase, so that there is a tendency to produce a correspondingly increased voltage in the second phase. This tendency to produce a higher voltage in the second phase is counteracted by the inductive drop of the windings in the first, as well as the second, phase, so that if the adjustment of field strength is properly made the terminal voltage of the second phase will be suited for delivering a balanced current to the motor. It is furthermore shown in the said patent how the relative phase relations in the first and second phase must be adjusted so that the phase distortion of the voltage produced by the motor current in the second phase is counteracted by a corresponding and opposite phase distortion in the adjustment of the voltage impressed upon the winding turns of the converter. In a phase converter thus properly adjusted for delivering balanced currents to a motor, the wattless energy is converted simultaneously and in the same way as the power energy. If, therefore, in accordance with the present invention, the wattless energy is generated directly in the converter, in the manner described, by the use of a synchronous field, the corresponding distortions of voltage caused by the phase conversion of the wattless energy will not exist, while the distortions due to the phase conversion of the power current will exist as before. The result is that a different adjustment of the voltages on the windings of the phase converter will be needed in order to result in balanced voltages on the motor phases when synchronous excitation is used and the voltage adjustment, necessary to obtain balanced polyphase currents with synchronous excitation, will depend upon the intensity of the synchronous excitation.

The adjustment of converter voltage, which is called for by the phase conversion of power currents, is principally vectorial distortion of the phases, whereas the adjustment called for by the phase conversion of wattless current is principally an increase of voltage impressed upon the first converter phase. From this it follows that when the wattless currents are generated by the phase converter, the adjustments of voltage corresponding to phase conversion of wattless current become of less importance and may be eventually wholly dispensed with, if it be desired to simplify the control equipment, and the only adjustment of voltages of the converter phases required will be that necessary to secure the proper vectorial distortion. Thus the control of a system of phase conversion, in which the multiple arrangement of connections obtains and in which the converter is provided with synchronous excitation, may consist in changing the vectorial distortion and the synchronous excitation simultaneously, the former being in proportion to the power delivered to the motors and the latter being proportional to the wattless energy delivered to the motor.

One feature which is worthy of observation in the design of systems of the kind under consideration is the balance of currents in the converter itself, because it does not necessarily follow from a balanced condition of the currents delivered to the motor phases that a balanced condition of the currents will obtain in the converter itself. The reason for this is that the wattless currents and the power currents flowing in the two phases of the converter are relatively opposite. The first converter phase is a motor phase for the power currents and a generator phase for the wattless curents, whereas, the second phase of the converter is a generator phase for both power currents and wattless currents. It is, however, possible to make such an adjustment of the voltages and synchronous excitation that the vectorial sum of power currents and wattless currents in the phases of the converter are equal, while the currents delivered to the phases of the motors are balanced so that the combination of motor and converter operates at unity power factor which is for other reasons the most desirable operating condition.

From the preceding discussion it is evident that a manual control system can be devised for effecting the desired adjustments.

While the theoretically ideal method of operation is to so operate the equipment that unity power factor and completely balanced polyphase converter and motor currents will result at all loads, this can scarcely be accomplished by manual control, and if it is desired to operate the equipment with these ideal characteristics at all loads, it becomes necessary to employ an automatic control scheme which will simultaneously effect the necessary voltage adjustments of the converter and the required adjustments of the converter excitation, leaving to the manual operation of the controller only those characteristics which effect the operation of the train to which the equipment is applied. If such an automatic scheme be employed it is possible, and, under some conditions, advisable to extend the automatic feature to the regulation of the effective voltage impressed upon the motor so that the motor will operate at the maximum efficiency.

It will be apparent from the foregoing that the control of the equipment can be worked out in several ways, depending upon the exactness with which the several desirable operating characterics are to be obtained.

One object of my invention is the provision of a method and means of control for a system, wherein one or more polyphase motors are operated from a single phase source of supply by the use of a phase converter of the polyphase induction motor type adapted to be synchronously excited independently of the converter windings to which the single phase source is connected and wherein the multiple arrangement of connections obtains.

Another object of my invention is the provision of a method and means of control for a system of the kind indicated in the preceding paragraph whereby as the load varies the adjustments necessary to the maintenance of balanced polyphase currents may be readily and simply effected.

Another object of my invention is the provision of a method and means of control for a system of the kind indicated in the second preceding paragraph whereby as the load varies the system may be readily adjusted so that it will operate with substantial unity or leading power factor and with substantially balanced polyphase currents.

Another object of my invention is the provision of automatic means of control for a system of the kind indicated in the third paragraph above, whereby, as the load upon the motor varies, the motors will operate at maximum efficiency, the polyphase currents will be maintained substantially balanced and the power factor of the system will be maintained substantially equal to unity.

Other objects of my invention will appear from the description of my invention herein set forth.

Figure 2:
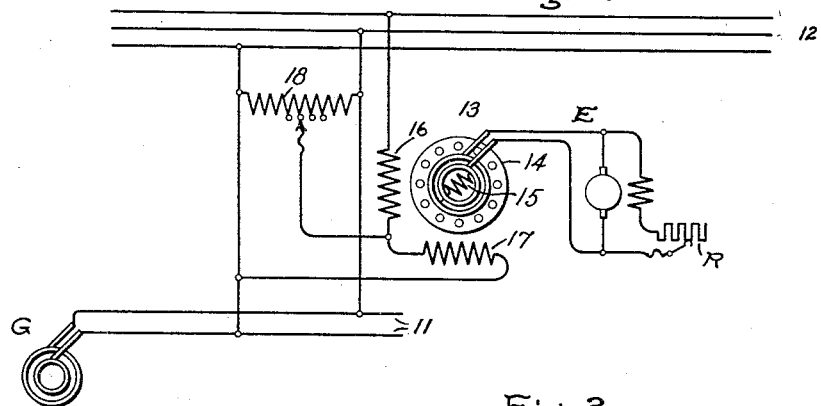
Figure 3:
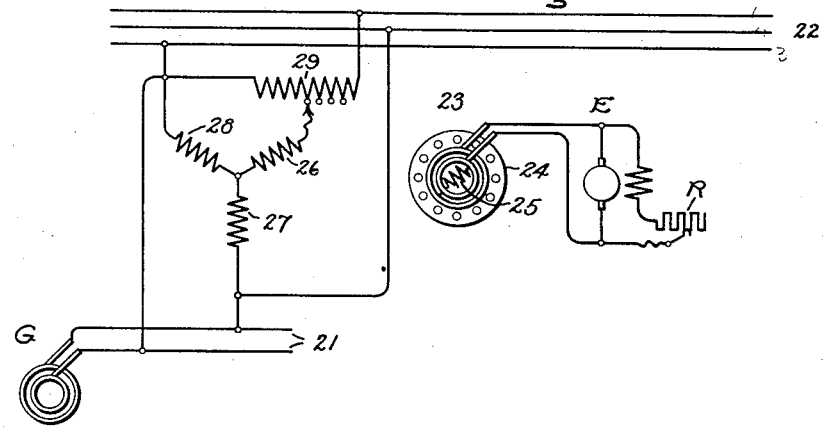
Figure 4:
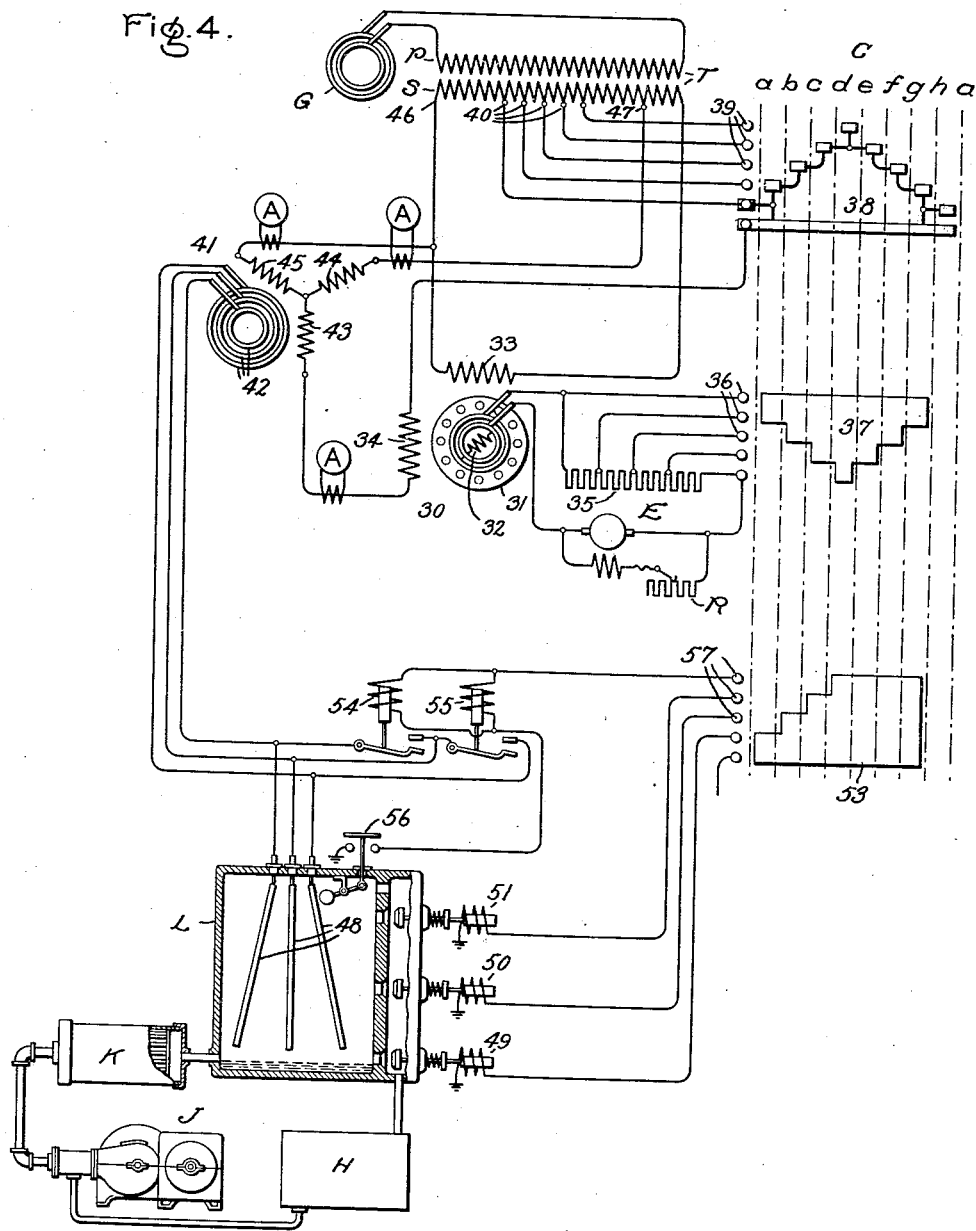
Figure 5:
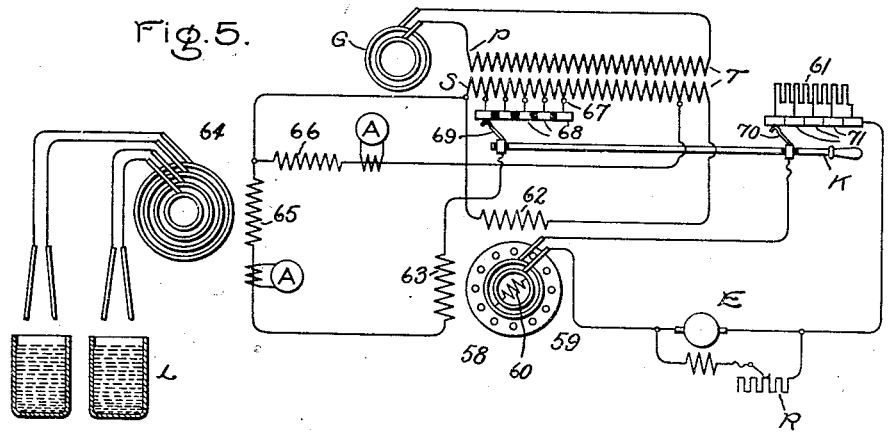
Figure 6:
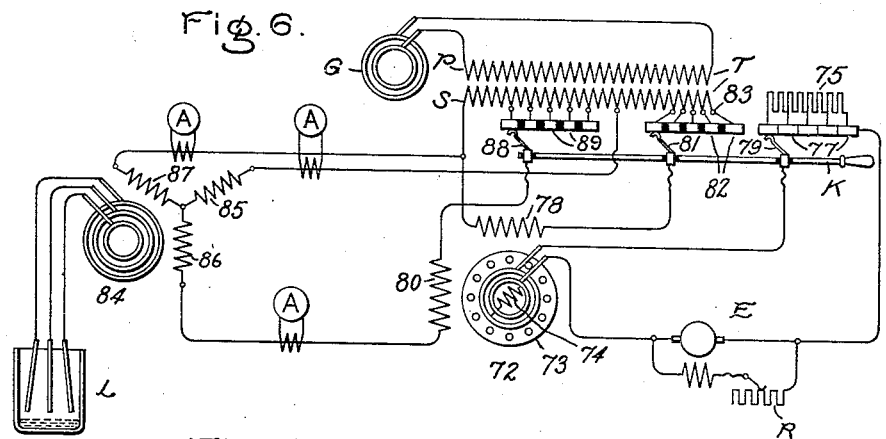
Figure 7:
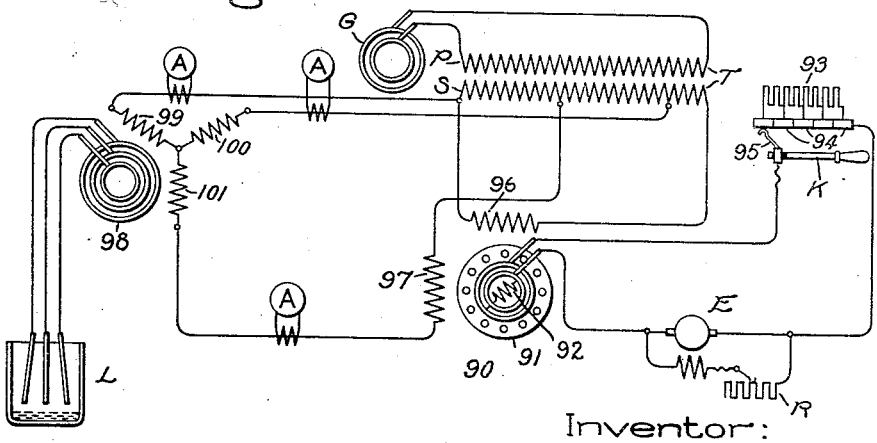

My invention will be more readily understood from the following description when taken in connection with the accompanying drawings in which:

Figure 1 is a diagrammatic showing of a synchronously excited phase converter of the polyphase induction motor type electrically interposed between a single-phase supply circuit and a two-phase load circuit, one phase of the converter being connected in multiple with one phase of the load circuit to the single-phase supply circuit; Fig. 2 is a diagrammatic showing of a system similar to that illustrated in Fig. 1, adapted to a three-phase supply circuit; Fig. 3 is a diagrammatic showing of a system similar to that illustrated in Fig. 1, adapted to a three-phase supply circuit in a somewhat different manner than in Fig. 2; Fig. 4 is a diagrammatic showing of a system comprising a single phase source of electrical energy, a three-phase induction motor, a phase converter electrically interposed therebetween, variable means for exciting the converter, and means for simultaneously controlling the voltage interpolated in a circuit including a converter phase and a motor phase, the converter excitation and the motor secondary; Fig. 5 is a diagrammatic showing of a system comprising a single phase source of electrical energy, a two-phase induction motor, a phase converter electrically interposed therebetween, variable means for exciting said converter, and means for simultaneously varying the voltage interpolated in a circuit including a motor phase and a converter phase, and the excitation of the converter; Fig. 6 is a diagrammatic showing of a system comprising a single phase source of electrical energy, a three-phase induction motor, a phase converter, variable means for exciting said converter, and means for simultaneously varying the voltage interpolated in a circuit including a motor phase and a converter phase, the voltage impressed upon another converter phase, and the converter excitation; Fig. 7 is a diagrammatic showing of a system comprising a single phase source of electrical energy, a three-phase motor, a phase converter, and variable means for exciting the converter; Fig. 8 is a diagrammatic showing of a system comprising a single phase source of electrical energy, a two-phase motor, a phase converter, variable means for exciting the converter, means for controlling the motor secondary, and automatic means responsive to current flowing in the motor phases for simultaneously varying the voltage interpolated in a circuit including a motor phase and a converter phase, the voltage impressed upon another motor phase and another converter phase, and the converter excitation.

Referring to Fig. 1, a single-phase supply circuit 1, connected to a single phase generator G, is adapted to supply energy to the two-phase load circuit 2. A phase converter 3 is provided with a plurality of windings 6 and 7, the former being connected to one phase of the load circuit 2, and the other being connected, in multiple with another phase of the load circuit 2, to the single-phase supply circuit 1. The converter has a rotor 4, which is provided with a short circuited winding and with an exciting winding 5 adapted to be supplied, through suitable slip rings, with direct current from the exciter E. The exciter is provided with a variable resistance R in series with its field whereby the current of the winding 5 may be adjusted.

Similarly in Fig. 2, a single phase supply circuit 11 connected to a single phase generator G, is adapted to supply energy to the three-phase load circuit 12. A phase converter 13 is provided with a plurality of windings 16 and 17, one terminal of winding 16 being connected to the first phase of the three-phase load circuit, one terminal of the winding 17 being connected to the third phase of the three-phase load circuit, and the other terminals of said windings 16 and 17 being connected, in common, to an intermediate point on the transformer winding 18, which is connected across the second and third phases of the three-phase load circuit. This point of connection is adapted to be varied to adjust the system for the maintenance of balanced polyphase currents at different loads. The single phase supply circuit 11 is connected across the second and third phases of the three-phase load circuit. The converter 13 is provided with a rotor 14 similar to the rotor 4 in Fig. 1, which is adapted to be synchronously excited by means of a winding 15 and the exciter E.

Similarly in Fig. 3 a single-phase supply circuit 21, connected to a single-phase generator G, is adapted to supply energy to the three-phase load circuit 22. The converter 23 is provided with three-phase, star connected windings 26, 27 and 28. The terminals of the windings 27 and 28 are connected respectively to the second and third phases of the three-phase load circuit, while the terminal of winding 26 is connected to an intermediate point on a transformer winding 29, which is connected across the first and the third phases of the three-phase load circuit. The point at which the terminal of winding 26 is connected to said transformer winding 29 is adapted to be varied to adjust the system for the maintenance of balanced polyphase currents at different loads. The single phase supply circuit 21 is connected across the second and third phases of the three-phase load circuit. The converter 23 has a rotor 24, similar to the rotor 4 in Fig. 1, which is adapted to be synchronously excited by means of a winding 25 and the exciter E.

Referring to Fig. 4, in which is illustrated a system wherein a three-phase induction motor is adapted to be operated from a single phase source, a single phase generator G is shown connected to the primary P of the transformer T. A phase converter of the polyphase motor type 30 having the windings 33 and 34 and a rotor 31, which may be of the phase wound or squirrel cage type, is adapted to be connected to the secondary S of the transformer and to induction motor 41. The induction motor is provided with star connected windings 43, 44 and 45 and with a phase wound motor 42, which is connected through slip rings to a liquid rheostat L. One terminal of the converter winding 33 is connected, in common with the terminal of the motor winding 45, to a point 46 on the secondary of the transformer. The other terminal of said converter winding 33 is connected to another point of said transformer secondary. The terminal of the motor winding 44 is connected to a point 47 on the secondary of the transformer. One terminal of the converter winding 34 is connected to the terminal of the motor winding 43 and the other terminal of said converter winding 34 is connected to the lowermost stationary contact 39 on the controller C, said stationary contact being constantly engaged by the lowermost movable contact of the controller element 38. The other stationary contacts 39 are connected to intermediate points 40 on the secondary of the transformer and are adapted to coöperate with the movable contacts of the controller element 38 so as to make electrical connection between the lowermost stationary contact 39 and the several points 40 on the transformer secondary.

The rotor 31 of the phase converter 30 is provided with a winding 32, adapted to be excited by means of the exciter E which is connected thereto through the resistance 35. From several points on this resistance conductors lead to the stationary contacts 36. Adapted to engage with the stationary contacts 36 is an element 37 which is mounted to rotate with the element 38. The element 37 is of conducting material and adapted, depending upon its position, to control the portion of the resistance 35 which is interposed in the circuit including the winding 32 and the exciter E.

In order to control the operation of the induction motor 41 a liquid rheostat L may be employed, the plates 48, of which, are connected to the slip rings of the induction motor secondary. Means comprising a motor driven pump J, a reservoir H, a cooler K, and electromagnetically operated valves 49, 50 and 51 may be employed for controlling the level of liquid in the rheostat. The windings of these valves are connected between certain of the contacts 57 and ground, and are adapted to be energized to close the valves when the controller element 53, which is, of conducting material, places the lowermost contact 57, which is connected through a source of electrical energy to ground, in electrical communication with the stationary contacts to which the windings are connected. When the valve 49 is opened the liquid level in the rheostat is below the lower extremities of the plates 48 and hence the induction motor secondary is open circuited. Upon valve 49 being closed the liquid level will rise and hence the secondary of the induction motor will be closed through the liquid rheostat. When the three valves 49, 50 and 51 are closed, the liquid level will rise and will cause the float operated switch 56 to close. If, then, the controller element 53 is moved into such a position as to electrically connect the uppermost stationary contact 57 to the lowermost contact 57, the switches 54 and 55 will close and short circuit the secondary of the induction motor independently of the liquid in the rheostat L.

The controller elements 37, 38 and 53 are mounted for simultaneous operation and, as shown, are designed for eight controller positions, although they may be designed for any other desired number of positions.

Ammeters A are connected by means of current transformers to indicate the current in the motor phases.

The operation of the system shown in Fig. 4 is as follows: Assume the connections to be as illustrated, the single phase generator to be supplying energy to the transformer and the converter to have been started. The windings 43, 44 and 45 of the induction motor will be energized as will also the windings 33 and 34 of the converter. The induction motor, however, will be at a stand-still since its secondary is open-circuited. The converter, on the other hand, will be operating at substantially synchronous speed since the winding 32 which is mounted on the rotor 31 will be excited from the exciter E through the resistance 35. In the position a of the controller, the voltage interpolated in the circuit including the converter winding 34 and the converter excitation have the minimum values.

If, now, it is desired to start the induction motor, the controller will be moved to operative position b. In this position the lower valve 49 will be closed and, since the pump J is continually in operation, the liquid will be drawn from the reservoir H and delivered to the liquid rheostat L, and hence the liquid level therein will rise to the level of valve 50. The induction motor therefore will start, having a considerable resistance in the secondary. Furthermore, with the controller in position b the voltage interpolated in the circuit, including the converter winding 34, is increased, as is also the excitation of the converter winding 32. Similarly continued movement of the controller through the operative positions c and d will cause the speed of the induction motor to increase, by decreasing the resistance of the liquid rheostat, and will increase the voltage, interpolated in the above mentioned circuit, and the excitation of the winding 32.

Upon the controller reaching the position e, the induction motor secondary will be short circuited by means of the switches 54 and 55, the excitation of the winding 32 will be at a maximum as will also the value of the voltage interpolated in the circuit including the converter winding 34. The induction motor is accelerated as the controller is moved from position a to e. From positions e to h inclusive, the induction motor secondary is maintained short circuited and the interpolated volts and the excitation of the winding 32 may be varied to maintain a balance of the polyphase current. The ammeters A are provided so that the operator may note any departure from a balanced condition of the polyphase currents, and may correspondingly adjust the position of the controller C to restore the desired balance.

Referring to Fig. 5, in which is illustrated a system wherein a two-phase induction motor is adapted to be operated from a single phase source, a single phase generator G is shown connected to the primary P of the transformer T. A phase converter of the polyphase motor type 58 having the windings 62 and 63 and a rotor 59, which may be of the phase wound or squirrel cage type, is adapted to be connected to the secondary S of the transformer and to the induction motor 64. The rotor 59 of the phase converter is provided with an exciting winding 60 which is adapted to be connected to the exciter E, the field strength of which may be adjusted by means of the resistance R. In series with the winding 60 is connected a variable resistance 61, to different points on which are connected the conducting elements 71 with which a brush 70 carried by, but insulated from, the controller member K is adapted to coöperate to vary said resistance. The induction motor 64 is provided with a phase wound secondary, the slip rings of which are connected to a liquid rheostat L which may be of the type illustrated in Fig. 4, or of any other well known type. The induction motor is provided with the windings 65 and 66. One terminal of the winding 65 is connected, in common with one terminal of the winding 66, to the left hand terminal of the transformer secondary S. The other terminal of the winding 65 is connected to one terminal of the converter winding 63. The other terminal of winding 63 is connected to a brush 69 which is carried by, but insulated from, the controller member K, and is adapted to be electrically connected through the conducting elements 68 to different taps 67 on the transformer secondary to vary the voltage interpolated in the circuit which includes windings 63 and 65.

The induction motor winding 66 is connected across a portion of the transformer secondary and the converter winding 62 is connected across a certain greater portion of said secondary. Ammeters A are connected to indicate the values of the currents flowing in the induction motor phases and thus will indicate to the operator any departure from a balanced relation thereof, whereupon the operator may vary the converter excitation and the interpolated volts in the manner necessary to restore the desired balance.

As previously indicated, by adjustment of the interpolated voltage and the synchronous excitation, as contemplated by Figs. 4 and 5, the desired relation of polyphase currents may be secured with sufficient accuracy for most purposes.

Referring to Fig. 6, in which is illustrated a system wherein a three-phase induction motor is adapted to be operated from a single phase source, a single phase generator G is shown connected to the primary P of a transformer T. A phase converter 72 of the polyphase motor type is provided with a rotor 73, of the squirrel cage or phase wound type, having a winding 74 adapted to be excited by means of the exciter E, the field of which may be adjusted by the resistance R. In series with the winding 74 is connected a variable resistance 75 to different points on which are connected the conducting elements 77 with which a brush 79 carried by, but insulated from, the controller member K is adapted to coöperate to vary said resistance. The converter is provided with windings 78 and 80, the former of which is connected to the left hand terminal of the transformer secondary and to a brush 81, which is carried by, but insulated from, the controller member K and is adapted to be electrically connected to different taps 83 on the transformer secondary by the engagement of said brush with the different conducting elements 82, which are connected to said taps. The induction motor 84 is provided with a phase wound secondary, the slip rings of which are adapted to be connected in the manner illustrated in Fig. 4, or in any other suitable way, to a liquid rheostat L. The induction motor is provided with star connected windings 85, 86 and 87. The terminals of windings 85 and 87 are connected across a certain portion of the transformer secondary and the terminal of winding 86 is connected to one terminal of the converter winding 80. The other terminal of the converter winding 80 is connected to a brush 88, which is carried by, but insulated from, the controller member K, and is adapted to be electrically connected to different points on the transformer secondary by the engagement of said brush with the different conducting elements 89, which are connected to said points. In Fig. 6 means are provided for simultaneously varying the converter excitation, the voltage impressed upon one of the converter windings 78, and the voltage interpolated in the circuit including the converter winding 80. As in Fig. 5, the ammeters A are employed to indicate to the operator the necessity of manipulating the controller member K in order to restore the balance of the polyphase currents.

Referring to Fig. 7, in which is illustrated a system wherein a three-phase induction motor is adapted to be operated from a single phase source, a single phase source of electrical energy G is shown connected to the primary P of the transformer T. A phase converter 90 is provided with a squirrel cage or phase wound rotor 91 having a winding 92 which is adapted to be excited by means of the exciter E, the field of which may be adjusted by the resistance R. In series with the winding 92 is connected a variable resistance 93, to different points on which are connected the conducting elements 94 with which a brush 95 carried by, but insulated from, the controller member K is adapted to coöperate to vary said resistance. The converter is provided with windings 96 and 97, the former of which is connected across the transformer secondary S. The induction motor 98 is provided with a phase wound secondary the slip rings of which are adapted to be connected to a liquid rheostat L. The induction motor is provided with a plurality of star connected windings 99, 100 and 101. The terminals of windings 99 and 100 are connected across a portion of the transformer secondary S and the terminal of winding 101 is connected to one terminal of the converter winding 97. The other terminal of the winding 97 is connected to an intermediate point on the transformer secondary. The connections illustrated in Fig. 7 are suitable for use where the motor load is uniform or the unbalancing of the pholyphase currents upon a departure of the motor load from a predetermined value is not of great importance, and where an adjustment of the converter excitation alone is advisable.

Referring to Fig. 8, wherein is illustrated a system in which a two-phase motor is adapted to be driven from a single phase source, a single phase source of supply G is shown connected to the primary P of the transformer T. A phase converter 102 is provided with a rotor 103, of the phase wound or squirrel cage type, having a winding 104 adapted to be excited by the exciter E, the field of which may be adjusted by the resistance R. In series with the winding 104 is connected a variable resistance 107, to different points on which are connected stationary contacts 108 which are adapted to be short circuited by the member 109 which is mounted upon the shaft of a controller C. The converter is also provided with a plurality of windings 105 and 106. One terminal of the winding 105 is connected to the right hand extremity of the transformer secondary, while the other terminal is connected to the uppermost of a series of stationary contacts 121. One terminal of the winding 106 is connected to the lowermost of a series of stationary contacts 111. The induction motor 113 is provided with primary windings 118 and 123, one terminal of the induction motor winding 118 being connected to the uppermost stationary contact 121, and the other terminal of the induction motor winding 118 being connected to a point 119 on the transformer secondary. One terminal of the induction motor winding 123 is connected to a point 124 on the transformer secondary and the other terminal is connected to one terminal of the converter winding 106, the other terminal of the converter winding 106 being connected, as previously indicated, to the lowermost stationary contact 111. Stationary contacts 111 are adapted to be engaged by conducting strips carried by the controller element 110, whereby the lowermost stationary contact 111 and hence one terminal of the converter winding 106 may be connected, depending upon the position of the controller, to the different taps 112 on the transformer secondary, and thereby the voltage interpolated in the circuit including the induction motor winding 123 and the converter winding 106 may be varied. The stationary contacts 121 are adapted to be engaged by conducting strips carried by the controller element 120, whereby the uppermost stationary contact 121 and hence one terminal of the converter winding 105 and the induction motor winding 118 may be electrically connected, depending upon the position of the controller, to the different taps 122 of the transformer secondary.

The secondary 117 of the induction motor is connected to conducting plates associated with the liquid rheostat 114. As shown, the liquid rheostat 114 comprises the plates to which the induction motor secondary is connected and a pair of liquid containers 115, mounted upon a non-conducting base which is adapted to be raised and lowered by means of the manually operated screw threaded shaft 116. Upon opening the circuits of the motor secondary by lowering the containers until the level of the liquid therein is below the plates, the induction motor may be stopped, although the primary windings are energized, whereas by raising the containers, and hence the level of the liquid, the circuits of the induction motor secondary may be closed and subsequently the resistance thereof decreased.

The controller elements 109, 110 and 120 are mounted to be operated by the motor M. Series transformers 125 and 126, connected in circuit with the motor phases, are adapted by means of electromagnets 127 and 128 to control the movement of a switch blade 129. In case the value of the current in winding 118 exceeds that in winding 123, the switch blade 129 will be rotated in a counter-clockwise direction, and engage stationary contacts 130, whereupon the motor M will be operated from a source of current, not illustrated, to rotate the controller C in one direction and, if the value of the current in winding 123 exceeds that in winding 118, the motor M will rotate the controller C in the opposite direction, the field winding F being effective in the former case and the field winding F' being effective in the latter case.

The operation of the system illustrated in Fig. 8, as understood, is as follows: Assume the controller C to be in the position illustrated, the liquid rheostat 114 to be adjusted so that the induction motor secondary is open, and the rotary converter 102 to have been started and to be in operation. The converter will now have a minimum excitation, a minimum voltage will be impressed upon the winding 105, and a minimum voltage will be interpolated in the circuit including the converter winding 106. By reason of the connections existing at this time the induction motor windings 118 and 123 will be energized, but, due to the fact that the induction motor secondary is open circuited, the induction motor will be at a stand-still. If, now, the liquid rheostat be adjusted to close the induction motor secondary, the induction motor will start, and, due to the design and proportions of the various parts of the system, the motor M will be controlled, by the mechanism which is operated by the currents flowing in the secondaries of the series transformers 125 and 126, to adjust the synchronous excitation of the converter, the voltage interpolated in the circuit including the converter winding 106, and the voltage impressed upon the converter winding 105 and motor winding 118, so that the polyphase currents will be balanced, the power factor of the converter will be substantially unity, and the effective voltage applied to the motor phases will be such that the motor will operate at maximum efficiency at the particular load. As the induction motor load is varied by varying the secondary resistance, further adjustment of the several electrical conditions is automatically effected to maintain the several desirable operating characteristics above mentioned.

The short circuited winding with which the rotor of the converter is provided performs an essential function in the transfer of energy from one converter phase to another converter phase. This winding may be variously considered as a secondary winding for one converter phase and a primary winding for a second converter phase; as an induced winding for one converter phase and an inducing winding for another converter phase; an absorbing energy from one converter phase and delivering energy to another converter phase; or as a motor element with respect to one converter phase and a generator element with respect to another converter phase. Said short circuit winding must be designed with a view to the double frequency currents present therein, to which currents, it may be noted, the converter action of the device is attributable. This winding may be completely distributed as shown, but this is not essential. The exciting winding for the rotor will be arranged to give a number of poles corresponding to that of the converter stator windings.

Although I have heretofore referred to that member of the converter, upon which are carried the windings which are connected to the polyphase and single phase circuits, as the stator, and that member, which carries the winding to which the direct current source is connected, as the rotor, it is to be understood that the former member may be the rotary member and the latter member the stationary member, and in the claims these members are referred to as relatively rotatable members.

Although but one motor is illustrated in each of the Figs. 4 to 8 inclusive, it is to be understood that any desired number of motors may be employed, it being necessary merely to proportion and design the apparatus with the number of motors and the capacity thereof in mind.

It will be noted that part of the subject matter illustrated, described and claimed herein, is divided from my copending application, Serial No. 815,280, filed January 29, 1914.

I conceive that various modifications of my invention may be made, and I accordingly do not desire to be limited to the exact arrangement shown, but seek to cover in the appended claims all such modifications and arrangements as fall within the spirit and scope of my invention.

What I claim as new and desire to secure by Letters Patent of the United States, is:—

1. In combination, a single phase source of electrical energy, a polyphase induction motor, adapted to be operated therefrom, a phase converter comprising relatively rotatable members, one of said members being provided with windings constituting a plurality of phases, one of said phases being connected to be traversed by current supplied to a motor phase, means for interpolating a portion of the voltage of said source in series with said converter phase, for impressing a portion of the voltage of said source upon another converter phase and for impressing a portion of the voltage of said source upon another motor phase, means for synchronously exciting the converter independently of said windings, and means for simultaneously varying the voltage interpolated in series with the first named converter winding and the converter excitation.

2. In combination, a single phase source of electrical energy, a polyphase induction motor adapted to be operated therefrom, a phase converter of the polyphase induction motor type comprising relatively rotatable members, one of said members being provided with a short circuited winding and another of said members being provided with windings constituting a plurality of phases, one of said phases being connected to be traversed by current supplied to a motor phase, means for interpolating a portion of the voltage of said source in series with said converter phase, for impressing a portion of the voltage of said source upon another converter phase and for impressing a portion of the voltage of said source upon another motor phase, means for synchronously exciting the converter independently of said windings, and means for simultaneously varying the voltage interpolated in series with the first named converter phase, the voltage impressed upon the second named converter phase, and the converter excitation.

3. In combination, a single phase source of electrical energy, a transformer having a primary winding adapted to be connected thereto, a polyphase induction motor, a phase converter having relatively rotatable members, one of said members being provided with a plurality of windings, one of which is adapted to be connected across a portion of the transformer secondary, another of which is adapted to be connected in series with a portion of the transformer secondary and so that it is traversed by the current in a phase of the induction motor, another phase of the induction motor being connected across a portion of the transformer secondary, another of said members being provided with a short circuited winding and an auxiliary winding, variable direct current means for exciting said auxiliary winding and means for simultaneously varying the portion of the transformer secondary across which the first-named converter winding is connected, the portion of the transformer secondary connected in series with the second named converter winding, the portion of the transformer secondary across which the second named motor phase is connected, and the amount of direct current flowing in the said auxiliary winding.

4. In combination, a single phase source of electrical energy, a polyphase induction motor adapted to be operated therefrom, a phase converter comprising relatively rotatable members, one of said members being provided with windings constituting a plurality of phases, one of said phases being connected to be traversed by current supplied to a motor phase, means for interpolating a portion of the voltage of said source in series with said converter phase, for impressing a portion of the voltage of said source upon another converter phase and for impressing a portion of the voltage of said source upon another motor phase, means for synchronously exciting the converter independently of said windings, means for varying the load on the induction motor, and means for simultaneously varying the voltage interpolated in series with the first named converter phase and the converter excitation as the load upon the motor varies.

5. In combination, a single phase source of electrical energy, a polyphase induction motor adapted to be operated therefrom, a phase converter comprising relatively rotatable members, one of said members being provided with windings constituting a plurality of phases, one of said phases being connected to be traversed by current supplied to a motor phase, means for interpolating a portion of the voltage of said source in series with said converter phase, for impressing a portion of the voltage of said source upon another converter phase and for impressing a portion of the voltage of said source upon another motor phase, means for synchronously exciting the converter independently of said windings, means for varying the load on the induction motor, and means for simultaneously varying the voltage interpolated in series with the first-named converter phase, the voltage impressed upon the second named converter phase, and the converter excitation as the load upon the motor varies.

6. In combination, a single phase source of electrical energy, a polyphase induction motor adapted to be operated therefrom, a phase converter of the polyphase induction motor type comprising relatively rotatable members, one of said members having a plurality of windings, one of said windings being connected to be traversed by current supplied to a motor phase, means for interpolating a portion of the voltage of said source in series with said converter winding, for impressing a portion of the voltage of said source upon another converter winding and for impressing a portion of the voltage of said source upon another motor phase, means, comprising a winding carried by another of said members and a source of direct current, for synchronously exciting the converter, means for varying the load on the motor, and means for simultaneously varying the voltage interpolated in series with the first named converter winding, the voltage impressed upon the second named converter winding, the voltage impressed upon the second named motor phase, and the converter excitation as the load upon the motor varies.

7. In combination, a single phase source of electrical energy, a polyphase induction motor adapted to be operated therefrom, a phase converter comprising relatively rotatable members, one of said members being provided with windings constituting a plurality of phases, one of said phases being connected to be traversed by current supplied to a motor phase, means for interpolating a portion of the voltage of said source in series with said converter phase, for impressing a portion of the voltage of said source upon another converter phase and for impressing a portion of the voltage of said source upon another motor phase, means for synchronously exciting the converter independently of said windings, and means for substantially simultaneously controlling the operation of the induction motor, the voltage interpolated in series with the first named converter winding, and the converter excitation.

8. In combination, a single phase source of electrical energy, a polyphase induction motor adapted to be operated therefrom, a phase converter comprising relatively rotatable members, one of said members being provided with windings constituting a plurality of phases, one of said phases being connected to be traversed by current supplied to a motor phase, means for interpolating a portion of the voltage of said source in series with said converter phase, for impressing a portion of the voltage of said source upon another converter phase and for impressing a portion of the voltage of said source upon another motor phase, another of said members being provided with a short circuited winding and an exciting winding, direct current means for exciting said exciting winding, and means for substantially simultaneously controlling the operation of the induction motor, the voltage interpolated in series with the first named converter phase and the excitation of said exciting winding.

9. The method of operating a system, comprising a single phase source of electrical energy, a polyphase induction motor adapted to be operated therefrom, a phase converter comprising relatively rotatable members, one of said members being provided with a short circuited winding and another of said members being provided with windings constituting a plurality of phases, one of which is connected to be traversed by current supplied to a motor phase, means for interpolating a portion of the voltage of said source in series with said converter phase, for impressing a portion of the voltage of said source upon another converter phase and for impressing a portion of the voltage of said source upon another motor phase, and means for synchronously exciting the converter independently of said windings, which consists in substantially simultaneously varying the load on the motor, the voltage interpolated in series with the first named converter winding, the voltage impressed upon the second named converter winding, the voltage impressed upon the second named motor phase, and the converter excitation.

10. In combination, a single phase source of electrical energy, a polyphase induction motor adapted to be operated therefrom, a phase converter of the polyphase induction motor type comprising relatively rotatable members, one of said members having a plurality of windings, one of said windings being connected to be traversed by current supplied to a motor phase, means for interpolating a portion of the voltage of said source in series with said converter winding, for impressing a portion of the voltage of said source upon another converter winding and for impressing a portion of the voltage of said source upon another motor phase, means, comprising a winding carried by another of said members and a source of direct current, for synchronously exciting the converter, means to control the operation of the induction motor, and automatic means controlled by the currents traversing the motor phases for simultaneously varying the voltage interpolated in series with the first named converter winding, the voltage impressed upon the second named converter winding, the voltage impressed upon the second named motor phase, and the converter excitation.

In witness whereof, I have hereunto set my hand this 21st day of February, 1917.

ERNST F. W. ALEXANDERSON.